Dec. 11, 1962     T. H. COOPER ETAL     3,067,799
MANUFACTURE OF CIRCUMFERENTIALLY CORRUGATED PIPES
Filed Oct. 13, 1959     3 Sheets-Sheet 1
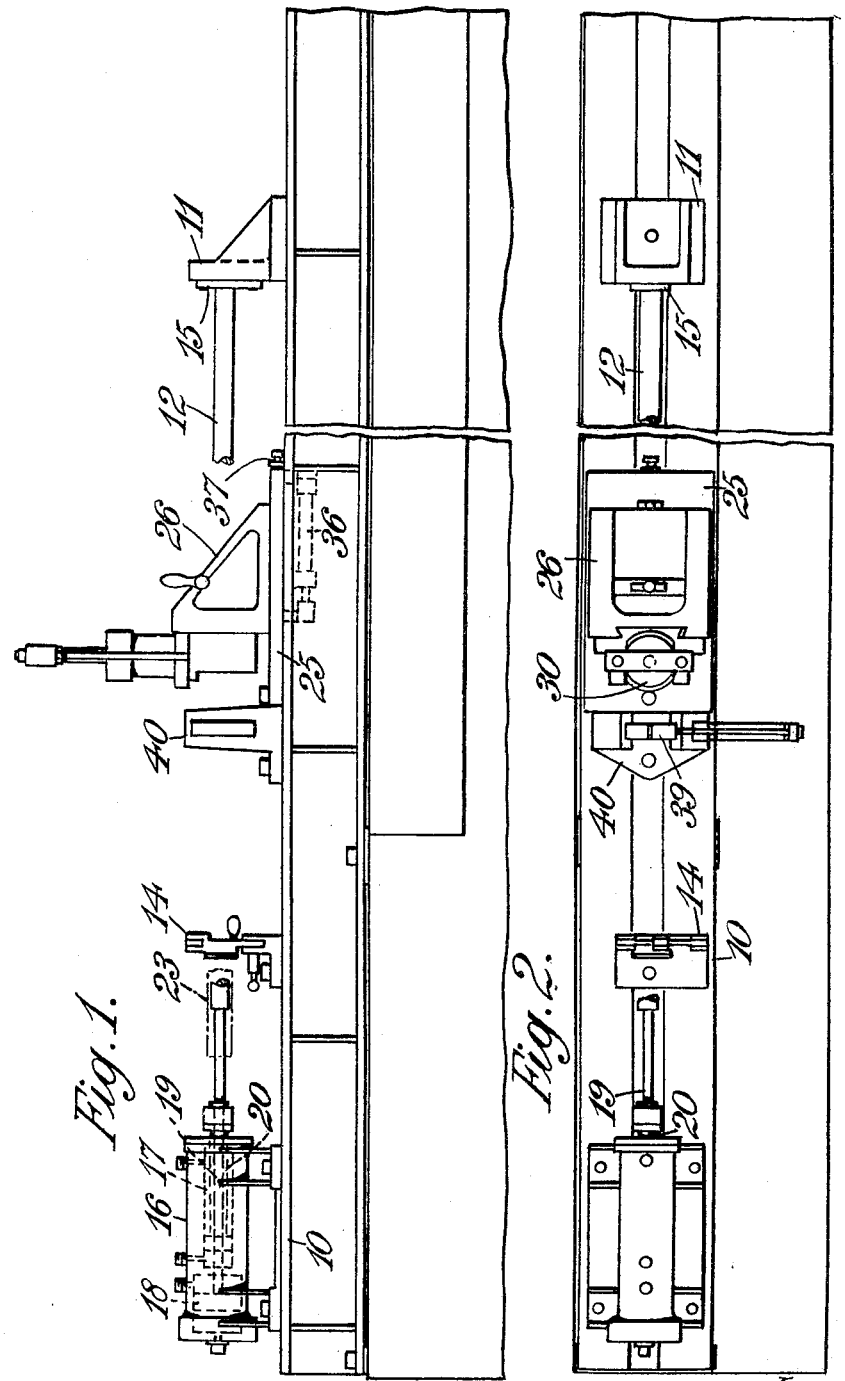
Inventors
Thomas Henry Cooper &
Stanley Harold Goward
By Hooper, Leonard & Buell
Their Attorneys

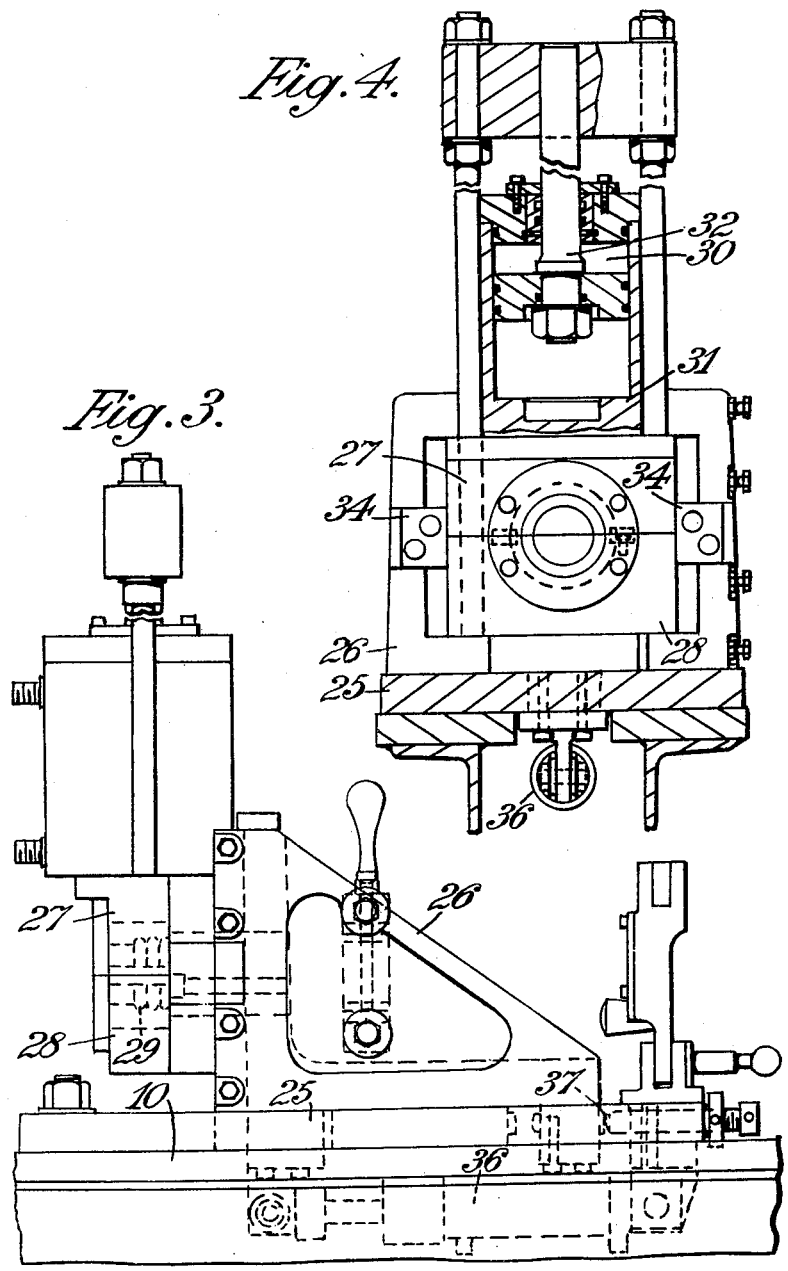

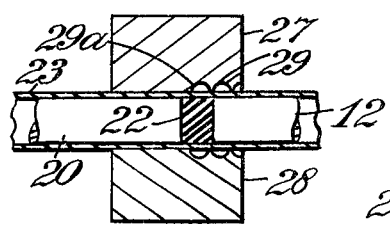
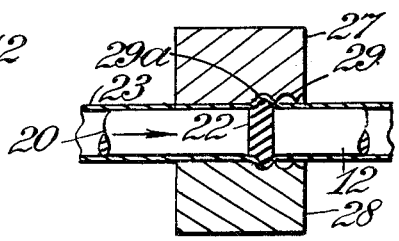
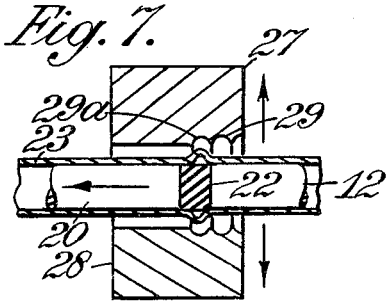
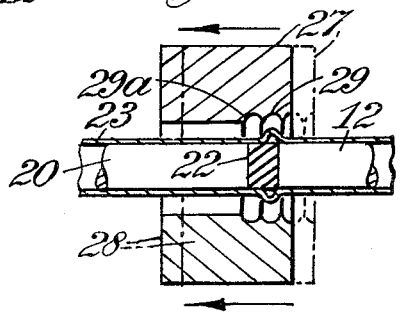
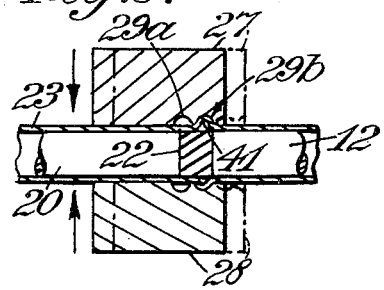
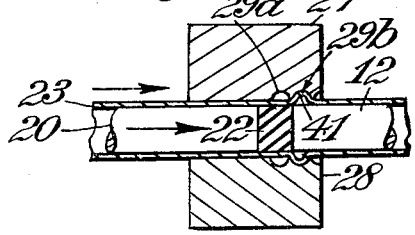

United States Patent Office 3,067,799
Patented Dec. 11, 1962

3,067,799
MANUFACTURE OF CIRCUMFERENTIALLY
CORRUGATED PIPES
Thomas Henry Cooper, and Stanley Harold Goward, London, England, assignors to Palmer Aero Products Limited, London, England, a British company
Filed Oct. 13, 1959, Ser. No. 846,140
Claims priority, application Great Britain Oct. 27, 1958
4 Claims. (Cl. 153—73)

The invention relates to a machine for use in the production of circumferential corrugations in pipes or tubes of ductile materials (e.g. metals) and is concerned with a machine of the kind in which to form the corrugations one end portion of the pipe is supported on a mandrel and a disc or ring of rubber or like resilient material has its diameter enlarged inside the pipe by compression of the disc or ring against the end of the mandrel to reduce its thickness, by means of a pusher operating through the other end of the pipe, the outside of the pipe being surrounded in the region of the disc or ring by an openable die having an annular internal groove into which the pipe is expanded by the enlargement of the disc or ring, the operation being repeated at successive positions along the pipe. It is to be understood that the corrugations consists of ribs and grooves which extend around the pipe and alternate along the pipe, or a portion thereof, and further that the corrugations are wholly or mainly of a diameter greater than that of the basic pipe. The invention has reference to means in such a machine for facilitating the production of the successive corrugations at their correct relative positions along the pipe and to a method of use of the machine to obtain this result.

According to the invention a machine of the above kind is characterised by means for moving the die in the axial direction by a distance equal to the pitch of the corrugations.

It is preferred that the die has two (or more) annular grooves of which one may receive and locate a previously formed corrugation in the pipe while the other is serving as a die for the formation of a further corrugation. The first of these two grooves may be replaced by equivalent locating stops.

In one method of using the machine to form a succession of corrugations along a pipe, the first corrugation is formed as above described into one groove of the die, the die is opened, the die is moved one pitch endwise away from the mandrel, the pipe remaining stationary meanwhile, the die is closed onto the pipe so that the second groove, or equivalent, engages the formed corrugation, and the die is then returned carrying the pipe with it into position for the formation of the next corrugation. These operations may then be repeated for additional corrugations. In an alternative procedure which may be adopted, a first corrugation is formed in a groove of the die by operation of the pusher, the other groove, or the equivalent, being around the mandrel, the die, still closed, is moved endwise along the mandrel by one pitch of the corrugations, carrying the pipe with it, the die is opened, returned and then closed, the second groove or the equivalent, closing onto the corrugation first formed thereby to locate the corrugation accurately and a further corrugation is formed in the first groove.

The machine preferably also has means for applying, during the expansion operation, an endwise force onto the pipe to tend to feed the pipe endwise into the die from the unworked end of the pipe whereby the tendency to draw material from a previously formed corrugation during the expansion of the pipe is reduced.

It is also preferred that the machine has holding means which grip and hold the pipe (e.g. the unworked end thereof) while the die is open.

A specific embodiment of a machine according to the invention will now be described by way of example and with reference to the accompanying drawings in which:
  FIGURE 1 is an elevation of the machine,
  FIGURE 2 is a plan of the machine,
  FIGURE 3 is a side view showing the forming die and associated parts,
  FIGURE 4 is a front view, partly broken awawy, of the die and parts shown in FIGURE 3, and
  FIGURES 5–10 are diagrams showing successive stages in the operation of the machine.

The machine comprises an elongated bed 10 with, at one end, an upstanding pillar 11 from which projects parallel to the bed a round section mandrel 12 which extends to the operating station at about the middle of the bed. The diameter of the mandrel nearly equals the inside diameter of the pipe to be worked so that the pipe will be slidable along the mandrel but supported by it. The mandrel is supported from the bed by two or more steadies. These are not shown but are similar to that shown at 14 for supporting the pusher, and later described. To facilitate removal of the mandrel and a finished corrugated pipe carried thereby, there is a hole through the pillar 11 aligned with the mandrel and normally covered by a stop plate 15. The plate is removable so that the mandrel can be withdrawn through the hole.

At the other end of the bed there are secured a cylinder block 16 providing two double-acting hydraulic cylinders 17, 18 having their rams 19, 20 in alignment along the bed. The ram 19 is in the form of a sleeve which surrounds the ram 20. The ram 20 constitutes a pusher and is operable to compress a disc of rubber 22 (see FIGURES 5–10) against the end of the mandrel 12. The outer ram, 19, is arranged to engage the free end of a pipe 23 being worked and fitted over the mandrel to push the pipe towards the mandrel.

Clamped to the bed 10 at about the centre thereof, there is a clamp 25 supporting an upstanding bracket 26 which carries a horizontally split circular die 27, 28 co-axial with the mandrel. Internally the die has the form of two and one-half annular grooves 29 each corresponding to the external shape of one of the desired corrugations (i.e. of approximately semi-circular cross-section). The two parts of the die are guided in the bracket for up and down movement towards and away from the mandrel axis and the bracket carries a double acting hydraulic cylinder 30, the cylinder body 31 being attached to the die part 27 and the ram 32 to the die part 28. A stop—the surface of clamp 25— limits the downward movement of the lower die-part. Application of pressure fluid to the lower end of the cylinder 30 moves both die parts to open the die and application of pressure to the other end closes the die. The die closes onto locating blocks 34.

The bracket 26 is slidable on the clamp 25 in the lengthwise direction of the bed and there is a double-acting hydraulic cylinder 36 which has its cylinder secured to the clamp beneath the die-carrying bracket 26 and its ram attached to the bracket so that it is operable to move the bracket to and fro along the clamp in the lengthwise direction of the bed. An adjustable stop 37 is provided to limit the movement of the bracket along the clamp in the direction away from the mandrel along the operating station. The clamp 25 also carries a further steady 38 for the mandrel.

There is also a hydraulically operated split clamp 39 on a bracket 40 upstanding from the bed 10 which is shown on the side of the die remote from the mandrel and adjacent to the die. This clamp, which is coaxial with the mandrel, is operable to grip and hold a pipe projecting from the mandrel beyond the die. The clamp may however be located on the opposite side of the die and be operable to grip a pipe around the mandrel.

A guide or steady 14 is provided for the pusher intermediate in the length thereof and secured to the bed, or there may be two or more such steadies equally spaced along the length of the pusher. Alternatively, depending on the length of pipe which projects from the part to be corrugated and hence the length of the pusher employed, this steady may be omitted or replaced by a further steady for the mandrel.

In the operation of the machine, one end of a length of pipe 23 to be corrugated is fitted over the end of the mandrel 12, the tube projecting from the mandrel through the die 27, 28 and over the pusher 20 there being a disc or plug of rubber 22 between ends of the pusher and mandrel. The die is closed onto the pipe with that groove, 29a, which is further from the mandrel, at the operating station (i.e. around the portion of the pipe immediately beyond the end of the mandrel as seen in FIGURE 5). The pusher 20 is then operated to compress the rubber disc and so to force the pipe wall outwardly into the die to form the first corrugation 41 (see FIGURE 6). The pressure on the rubber is then released and the clamp 39 is closed onto the pipe. The die is then opened (FIGURE 7) and moved one corrugation pitch to the left, as shown, into the position of FIGURE 8. The clamp 39 is released and the die is now closed to engage the already formed corrugation 41 in the second groove (29b) of the die (FIGURE 9). Next the die is returned to the right up to the stop 37, carrying with it the pipe (FIGURE 10). The machine is now ready for the production of the next corrugation. For this the above sequence of operations is repeated and, in addition, the ram 19 is engaged with the free end of the pipe and applies pressure to it during compression of the rubber to ensure that the metal required to form the corrugation is supplied from the unworked portion of the pipe and is not drawn from the previously formed corrugation. Pressure is applied in this way for the formation of each corrugation after the first.

The machine incorporates a hydraulic pump for supplying fluid pressure to the several ram cylinders and five cam operated valves for controlling the application of the pressure to the cylinders in the correct sequence whereby automatic operation of the machine is achieved. There is also a trip device which may be pre-set to stop the cam movements and so the machine as a whole after a predetermined number (e.g. between 1 and 15) of corrugations have been formed.

As the ram 20 is not withdrawn after the formation of each corrugation but follows up the pipe as it progresses along the mandrel, the cam controlled valve for the cylinder of this ram admits pressure fluid, at the appropriate times, only to the left-hand end of the cylinder 17 as seen in FIGURE 1. There may however be provided a manually operated valve for effecting admission of the pressure fluid to the right hand end of cylinder 17 when it is required to withdraw the ram at the end of the operations on a pipe.

To produce the first corrugation, the first operations required are the closing of the die and the compression of the rubber. To ensure this result latch means are provided for holding off from their respective cams the followers which operate the valves for controlling the clamp 39, the ram 19 and the cylinder 36, until the first corrugation has been formed. The cams are mounted on a common cam shaft and, on the same shaft, there is a further cam which operates to release the latch when the first corrugation has been formed. The latch means are then held disengaged by a releasable catch until the machine is being pre-set for a new pipe.

We claim:

1. A machine for use in the formation of a succession of circumferential corrugations in a pipe of ductile material and comprising a mandrel for supporting the pipe internally, a plug of resiliently deformable material at the end of the mandrel, means for pressing the plug against the end of the mandrel to expand the plug radially, a diametrically divided openable die around the plug and having at least two internal circumferential grooves spaced apart in the axial direction by one pitch of the corrugations and into one of which grooves the pipe may be expanded by the plug to form a corrugation, pushing means directed against the free end of the pipe for applying a lengthwise force on the pipe during the expanding operation and in the direction to feed the pipe into the die from the unworked end of the pipe, while holding the worked end of the pipe stationary means for opening and closing the die, means for moving the die, while closed, lengthwise of the mandrel and relative thereto by a distance equal to the said pitch of the corrugations, and means for operating the plug-pressing means, the die opening and closing means, the pushing means, and the die moving means in a cycle in which the die is closed onto a pipe supported on the mandrel with one groove containing a previously formed corrugation, the plug is expanded to expand the pipe into the other groove to form another corrugation, a lengthwise force is applied to the pipe during the expanding operation, the plug is allowed to contract, the die is opened, the die is moved one pitch in the lengthwise direction of the mandrel, the pipe remaining stationary meanwhile, the die is closed onto the pipe with the said one groove engaging the corrugation last formed and the die is then returned carrying the pipe with it into position for the formation of the next corrugation in the said other groove.

2. A machine as claimed in claim 1 having releasable means for holding the pipe against lengthwise movement and means for operating the holding means to hold the pipe when the die is opened and for releasing the pipe when the die is closed.

3. A machine for use in the formation of a succession of circumferential corrugations in a pipe of ductile material and comprising a mandrel for supporting the pipe internally, a plug of resiliently deformable material at the end of the mandrel, means for pressing the plug against the end of the mandrel to expand the plug radially, a diametrically divided openable die around the plug and having at least two internal circumferential grooves spaced apart in the axial direction by one pitch of the corrugations and into one of which grooves the pipe may be expanded by the plug to form a corrugation, pushing means directed against the free end of the pipe for applying a lengthwise force to the pipe during the expanding operation of the plug and in the direction to feed the pipe into the die from the unworked end of the pipe while holding the worked end of the pipe stationary, means for opening and closing the die, means for moving the die, while closed, lengthwise of the mandrel and relative thereto by a distance equal to the said pitch of the corrugations and means for operating the plug-pressing means, the pushing means, the die opening and closing means, and the die moving means in a cycle in which the die is closed onto a pipe supported on the mandrel with one groove containing a previously formed corrugation, the plug is expanded to expand the tube into the other groove to form another corrugation, a lengthwise force is applied to the pipe during the expanding operation, the plug is allowed to contract, the die, still closed, is moved one pitch in the lengthwise direction of the mandrel carrying the pipe with it to bring a fresh part of the pipe over the plug, the die is opened, returned and then closed onto the pipe with the said one groove engaging the corrugation last formed and the said other groove in position for the formation therein of the next corrugation.

4. A machine as claimed in claim 3 having releasable means for holding the pipe against lengthwise movement and means for operating the holding means to hold the pipe when the die is opened and for releasing the pipe when the die is closed.

References Cited in the file of this patent

UNITED STATES PATENTS

| | | |
|---|---|---|
| 1,879,663 | Dreyer | Sept. 27, 1932 |
| 2,306,018 | Feutress | Dec. 22, 1942 |
| 2,358,291 | Feutress | Sept. 12, 1944 |
| 2,581,787 | Dreyer | Jan. 8, 1952 |
| 2,825,387 | Alltop et al. | Jan. 8, 1952 |
| 2,749,963 | Caudee | June 12, 1956 |
| 2,773,538 | De Mers | Dec. 11, 1956 |